Oct. 1, 1968  S. L. STARK ET AL  3,403,939

VEHICLE DUMP DOOR OPERATING LINKAGE

Filed Nov. 23, 1966  3 Sheets-Sheet 1

INVENTORS
SHELDON L. STARK
JOHN H. BABBITT, JR.

BY

ATTORNEYS

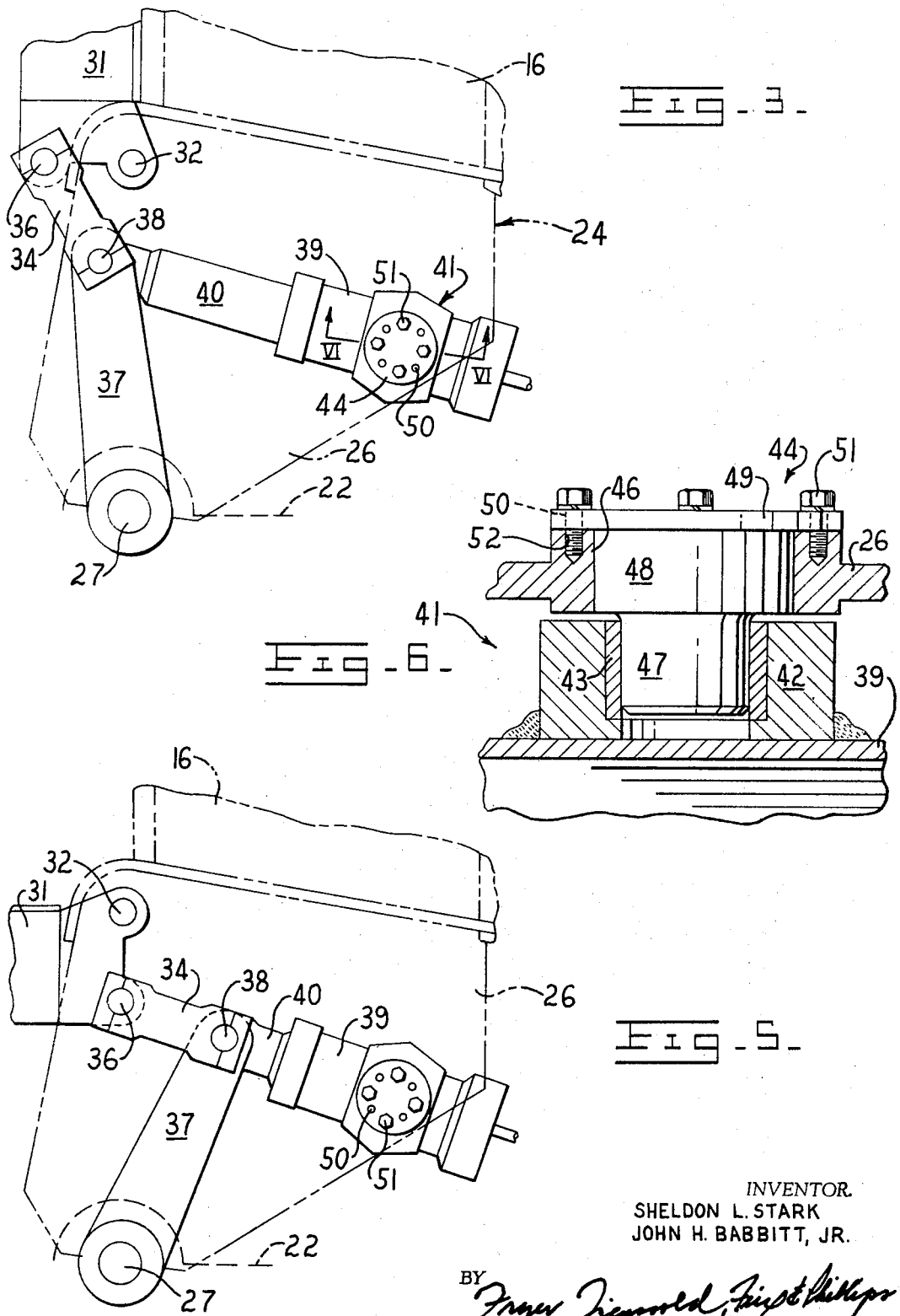

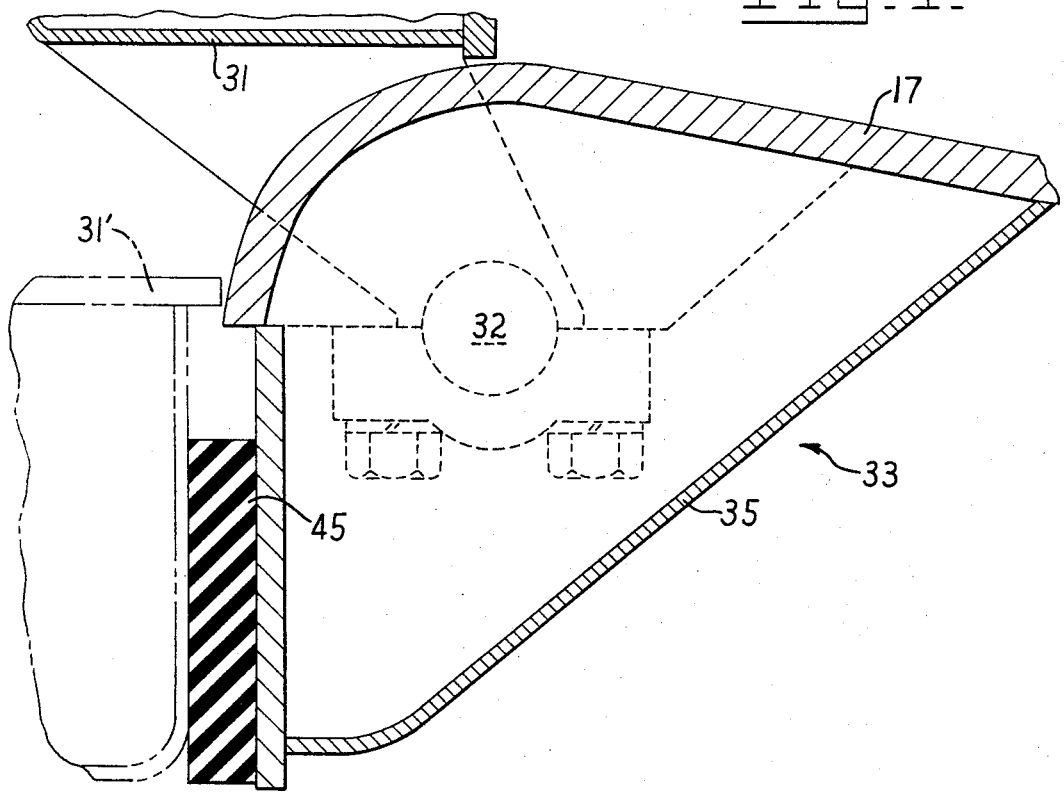
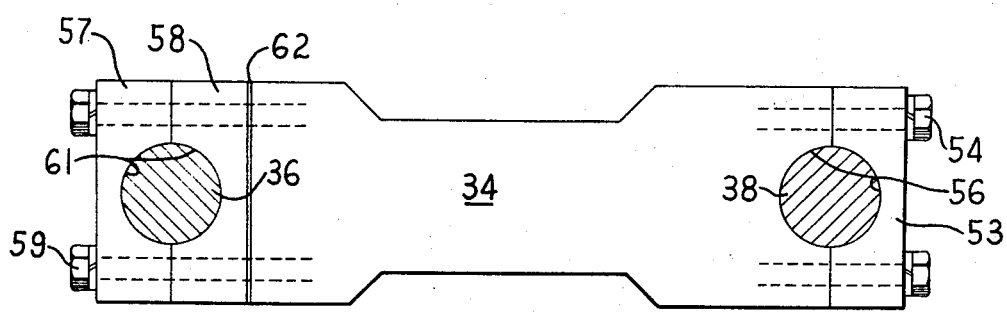

United States Patent Office 3,403,939
Patented Oct. 1, 1968

3,403,939
VEHICLE DUMP DOOR OPERATING LINKAGE
Sheldon L. Stark, Bloomington, and John H. Babbitt, Jr., Peoria, Ill., assignors to Caterpillar Tractor Co., Peoria, Ill., a corporation of California
Filed Nov. 23, 1966, Ser. No. 596,670
9 Claims. (Cl. 298—23)

ABSTRACT OF THE DISCLOSURE

Fluid jack operated mechanism for manipulating the dump door of a truck body has a pair of coupled toggle links connected between the door and the body pivot axis with the jack being coupled to the knee of the toggle in an arrangement which provides a relatively constant effective lever arm and an efficient variation of mechanical advantage and rate of door motion during the course of the door movement. The mechanism is readily adjustable to accommodate to manufacturing variations in the associated truck structure.

This invention relates to vehicles of the class having a load carrying body which tilts to discharge the contents thereof and more particularly to a more adaptable and efficient mechanism for operating the dump door through which the load is released.

The load carrying body of a dump vehicle usually has a pivoted wall forming a dump door that swings outwardly when the body is tilted to discharge the load. While the dump door, which may be either an end wall or a side wall, may be pivoted along the top edge of the body, it is generally preferable to hinge the lower edge of the door to the floor of the body. A bottom hinged door forms an extension of the floor during dumping so that the load is deposited further outwardly from the vehicle and has the further advantage of providing an unobstructed passage. In addition, this type of door is less subject to damage from loading equipment and heavy objects which may strike the upper edge of the body during loading as it is more readily arranged to be held closed by means capable of yielding under such impacts. Fluid operated jacks may be used to operate the door and such systems are readily arranged to yield under some predetermined amount of force.

The fluid jack operated linkages heretofore used for manipulating bottom pivoted dump doors have not been fully satisfactory in several respects. Such mechanisms have tended to be bulky and have not been readily adjustable to adapt to the small variations of the pivot points from the designed locations which are inevitable in the manufacture of large welded structures such as truck bodies. In addition, such linkages have not provided preferred operating characteristics. The effective lever arm varies widely during the door closing movement and the linkage itself does not inherently vary the mechanical advantage and the rate of door motion in the most advantageous manner. In order to correct for these conditions, it may be necessary to use a larger jack and more complex hydraulic control circuit than would otherwise be necessary.

The present invention provides a compact fluid jack operated dump door manipulating mechanism in which the several desirable characteristics discussed above are an inherent property of the linkage and associated structure. The invention utilizes a toggle linkage coupled between the base of the dump door and the pivot about which the vehicle body tilts during dumping. The jack is coupled to the knee of the toggle linkage in an arrangement which provides a relatively constant lever arm during manipulation of the door and which provides for rapid motion during the initial phases of the door closing movement followed by a progressive slowing as the door approaches the fully closed position. The mechanical advantage increases as the door approaches the closed position at which the door must support a load in the truck body. In a preferred form, the jack is pivotably mounted by eccentric trunnions which may be rotated to shift the pivot axis of the jack and thereby avoid bottoming out of the piston in the jack which might otherwise result from manufacturing variations in the location of pivot points.

Accordingly it is an object of this invention to provide a compact highly efficient and adaptable mechanism for operating the dump door of a load carrying vehicle.

It is a further object of the invention to provide a fluid jack controlled dump door pivoting mechanism which is readily adjustable to compensate for the deviations of connecting points from the designed location which may occur in the manufacture of truck bodies.

It is still a further object of the invention to provide a fluid jack operated linkage for manipulating the dump door of a vehicle which provides a relatively constant lever arm and which inherently varies the rate of door movement and the mechanical advantage in an optimum manner.

The invention, together with further objects and advantages thereof, will best be understood by reference to the following specification in conjunction with the accompanying drawings of which:

FIGURE 3 is an elevation view showing details of the dump door operating mechanism of the truck of FIGURES 1 to 2 with the dump door closed and the body in its lowered position;

FIGURE 4 is a section view taken along line IV—IV of FIGURE 1 showing stop means for limiting opening of the dump door;

FIGURE 5 is an elevation view of the dump door operating mechanism with the door opened and the body in the lowered position;

FIGURE 6 is a partial section view taken along line VI—VI of FIGURE 3 and showing the eccentric trunnion mounting of the hydraulic jack which operates the mechanism; and FIGURE 7 illustrates an adjustable toggle link employed in the door operating mechanism of FIGURES 1 to 6.

Figure 1:
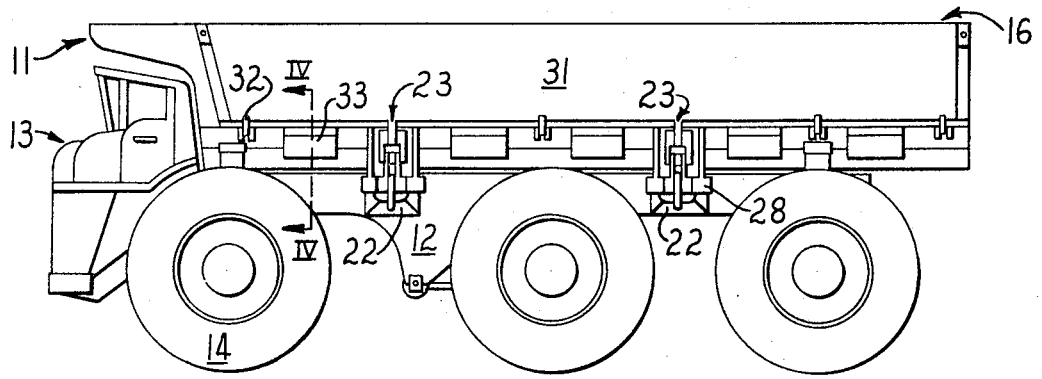
FIGURE 1 is a side elevation view of an off-highway truck having a side dumping load carrying body embodying the invention.

Referring now to the drawing and more particularly to FIGURE 1 thereof there is shown a truck 11 of the type designed for off-highway operation in conjunction with construction, mining and other similar activities which require a dump vehicle capable of carrying extremely large bulk loads. The truck 11 has a frame 12, wheels 14, and an engine compartment and operator's cab 13 at the forward end. An essentially rectangular body 16, open at the top, is carried on the frame 12 for receiving and transporting the load. Such a truck may be designed to carry very large loads, of the order of 75 to 100 tons, for example and thus high strength and rigidity are important considerations in the design of the body 16 and in the supporting and manipulation mechanism therefor. The truck 11 in this example is arranged to dump the load sidewardly at the left, or operator's side of the vehicle, this being a generally preferable arrangement inasmuch as the operator may better position the vehicle for dumping.

Figure 2:
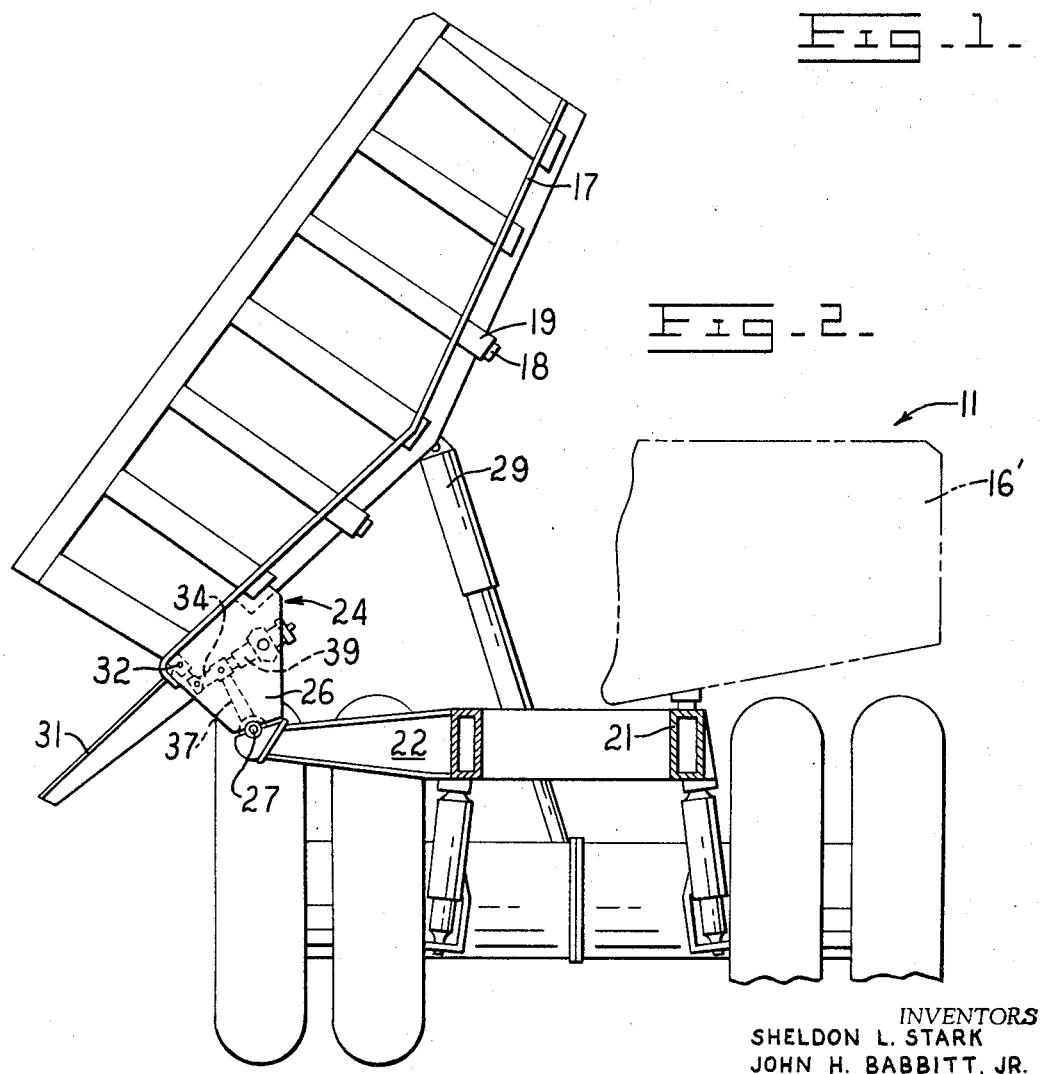
FIGURE 2 is a rear elevation view of the truck of FIGURE 1 showing the body thereof tilted and the dump door opened to provide for the discharge of a load, the rear axle and wheel structure of the vehicle being absent in order to better illustrate the present invention.

Referring now to FIGURE 2 in conjunction with FIGURE 1, body 16 has a floor 17 which slopes slightly upward at each side of the centerline of the vehicle. Pads 18 are secured to the underside of the longitudinal frame members 19 which extend beneath the floor 17, the pads being positioned to rest upon the principal longitudinal members 21 of the vehicle frame 12 to support the body 16 when it is in its lowered position as shown at 16' in FIGURE 2.

To provide for tilting of the body 16 during dumping, a pair of outrigger arms 22 extend sidewardly from the frame member 21 at the left side of the vehicle. As shown in FIGURE 1 in particular, two such outrigger arms 22 are employed in this particular truck although a greater number may be used if necessary to provide adequate strength and rigidity. Identical pivot assemblies 23 are situated at the end of each of the outriggers 22 to couple the truck body 16 thereto in a pivotable manner. With reference again to FIGURE 2 in conjunction with FIGURE 1, each such assembly 23 has a U-shaped bracket 24 secured to the left edge of the truck body 16 above the end of the outrigger 22 and with the parallel side members 26 of the bracket extending downwardly from the body on opposite sides of the outrigger. A pivot 27 extends through sleeves 28 at the lower end of each bracket member 26 and through the interposed end of the outrigger 22 thereby coupling the truck body to the outrigger in a pivotable manner. As shown in FIGURE 2 in particular, a hydraulic hoist jack 29 is connected between the center of the underside of the truck body 16 and the frame 12 of the truck to tilt the body about pivot 27 in order to dump the load. Hoist jack 29 is preferably controlled from the operator's cab.

The left side wall of the truck body is a dump door 31 coupled to the body by a series of pivot connections 32 distributed along the lower edge of the door. Door 31 may thus swing outwardly as illustrated in FIGURE 2, when the body 16 is tilted up, allowing the load to slide out of the body and carrying the load well outwardly from the side of the truck 11.

Considering now the mechanism with which the dump door 31 is manipulated and controlled, with reference to FIGURE 3, an upper toggle link 34 has an upper end pivoted to the door by pin 36 situated at the lower edge of the door and spaced a small distance outwardly from the pivot 32 which connects the door to the truck body 16. The bottom end of link 34 is pivoted to the top end of a longer lower link 37 by a transverse pin 38 and the lower end of the link 37 is pivotably engaged on the pin 27 which couples the bracket wall members 26 to the end of the outrigger arm 22.

To operate the linkage, hydraulic jack 39 is pivotably mounted by a trunnion assembly 41 between the parallel side members 26 of bracket 24. The pivot axis of the jack 39 is at a level between that of pivot pins 27 and 36 and is inwardly therefrom under the truck body 16. The extensible rod 40 of jack 39 is pivoted to the pin 38 which couples the toggle links 34 and 37. The links 34 and 37, and jack 39 are proportioned so that with the truck body 16 lowered and the dump door 31 closed, as illustrated in FIGURE 3, the common pivot connection 38 of the three members is located slightly to the right of a line connecting pivot pins 27 and 36. This avoids a dead center alignment of the links 34 and 37 which would prevent the dump door 31 from opening by gravity, where the jack 39 is of the single acting type, and provides for holding the door closed through the force exerted against the pivot pin 38 by the jack.

With referenec to FIGURE 1 in conjunction with FIGURE 4, opening of the door 31 is limited by a series of stops 33 along the lower edge of the truck body floor 17. As shown in FIGURE 4 in particular, each such stop 33 has a bracket structure 35 secured to the truck body which supports a resilient pad 45 in position to be contacted by the base of the door 31 at its open position 31' thereby blocking further pivoting of the door. At this position of the door, the upper toggle link 34 and the rod 40 of jack 39 assume a straight or dead center alignment as shown in FIGURE 5. The rate of door opening may be controlled by providing for an appropriate flow restriction in the driving fluid return of the jack 39.

To provide for shifting of the pivot axis of jack 39 to accommodate the mechanism to manufacturing variations in the location of pivot points, the jack is coupled to the associated bracket 24 through a pair of adjustable trunnion assemblies 41. Referring now to FIGURE 6, each such assembly 41 includes a short sleeve 42 secured to the side of the jack 39 and having a lining of bearing material 43. A stepped axle pin 44 extends through a bore 46 in bracket member 26 and has an inner end 47 journalled in the bearing 43 of sleeve 42.

The intermediate section 48 of axle pin 44 is of greater diameter than the inner end 47 and is eccentric relative thereto so that rotation of the axle pins 44 within bore 46 of member 26 acts to shift the position of jack 39.

Axle pins 44 have a circular outer end 49 of still greater diameter which is transpierced by bolts 51 which engage in threaded bores 52 in bracket member 26 to secure the axle thereto. A sizable number of bores 50, eight for example, are equiangularly spaced on the axle end section 49 so that a shift of the pivot axis of jack 39 may be made by removing the bolts 51, rotating the eccentric axle pins 44 an appropriate amount and replacing the bolts with the jack 39 in the readjusted position.

Adjustment of the toggle linkage itself may be provided for by making one of the links, such as upper link 34, of adjustable length. Referring now to FIGURE 7, the link 34 may have a bearing cap 53 secured to one end by longitudinal bolts 54. Complementary semi-circular grooves 56 in the bearing cap 53 and adjacent end of link 34 define the passage for pivot pin 38. Two such caps 57 and 58 are secured to the opposite end of the link 34 by additional bolts 59 with the passage for pivot pin 36 being defined by semi-circular grooves 61 in the adjacent faces of the two caps. This construction provides for increasing or decreasing the length of the link 34 by inserting or removing an appropriate thickness of shims 62 between the end of the link 34 and the innermost end cap 58.

Thus the door operating mechanism can readily be adapted to a specific truck body irrespective of variations in the location of the several pivot connections on the body which may arise during manufacture or from other causes.

A further property of the described construction is that the rate of pivoting movement of the door 31 decreases as the closed position is approached while the mechanical advantage of the system progressively increases. Thus the door 31 is caused to seat gently at its closed position and can be firmly held thereat by jack 39 against the pressure exerted on the door by material carried in the truck body 16. The effective lever arm, for all door positions is the distance from the center of door pivot 32 to a line passing through the centers of pivots 36 and 38 taken along a perpendicular to such line. A comparison of FIGURES 3 and 5 makes it evident that this effective lever arm does not vary much during operation of the door. In a representative embodiment of the invention, the lever arm is 5.12 inches with the door closed and 5.62 inches when the door is fully open.

While the invention has been described with respect to a dump door at the left side of a vehicle, it will be apparent that it is applicable to closures at either side, or at the end of the vehicle.

Numerous modifications may be made within the scope of the invention and it is not intended to limit the invention except as defined in the following claims.

What is claimed is:

1. In a vehicle of the class having a load carrying body pivoted thereto, said body being tiltable to discharge said load and having a dump door wall pivoted thereto along the base thereof to release said load when said body is tilted, a mechanism for manipulating said door comprising, in combination, a first toggle link having a first end pivotable about the pivot axis of said body, a second toggle link having a first end pivotably connected to said door at a position spaced from the pivot axis of said door, a first pivot coupling connecting the second end of said first link with the second end of said second link, a fluid operated jack having an extensible element connected to said first pivot coupling, and a second pivot coupling connecting said jack to said body with the pivot axis of said second coupling being parallel to that of said door whereby operation of said jack swings said door to the closed position thereof.

2. Mechanism as defined in claim 1 wherein said second toggle link and said extensible element of said jack are substantially in alignment when said door is at the open position thereof.

3. Mechanism as defined in claim 1 wherein said first pivot coupling is displaced from a line extending between the pivots at said first ends of said first and second links when said door is in the closed position thereof.

4. Mechanism as defined in claim 1 wherein said first link is longer than said second link.

5. Mechanism as defined in claim 1 wherein at least one of said links is of adjustable length.

6. Mechanism as defined in claim 1 further comprising means for adjusting the position of said jack relative to said body.

7. Mechanism as defined in claim 1 wherein said second pivot coupling is comprised of an axle having first and second portions which are eccentric with respect to each other, one of said portions being journalled to said jack and the other of said portions being coupled to said body by means which provide for rotation of said axle relative to said body, and means for fastening said axle at a selected angular orientation thereof.

8. Mechanism as defined in claim 1 wherein said jack is situated between spaced downwardly extending members of a bracket secured to said truck body and wherein said second pivot coupling comprises means forming a bearing on two opposite sides of said jack adjacent said bracket members, a pair of axle pins each having a first section extending into one of said bracket members and having a second section which is eccentric relative to said first section and which extends into said bearing at the adjacent side of said jack, and disengageable means for fastening each of said axle pins at a selected angular position relative to the associated bracket member.

9. Mechanism as defined in claim 8 wherein each of said axle pins has a third portion of greater diameter than said second portion thereof and which overlaps the adjacent one of said bracket members, and wherein said disengageable means for fastening said axle pins relative to said bracket members comprises a plurality of removable bolts transpierced through said third section of said axle pins and engaging the adjacent one of said bracket members.

References Cited
UNITED STATES PATENTS

| | | | |
|---|---|---|---|
| 1,955,167 | 4/1934 | Barrett | 298—23 X |
| 1,983,280 | 12/1934 | Flowers | 298—23 X |
| 2,989,930 | 6/1961 | Flowers | 105—240 X |
| 3,235,310 | 2/1966 | Medley | 298—23 |

RICHARD J. JOHNSON, *Primary Examiner.*